United States Patent
Davoust et al.

(10) Patent No.: US 11,761,425 B2
(45) Date of Patent: Sep. 19, 2023

(54) TURBULENCE INTENSITY ESTIMATION

(71) Applicant: General Electric Renovables España, S.L., Barcelona (ES)

(72) Inventors: Samuel Davoust, Garching bei München (DE); Srinivas Kandasamy, Bangalore (IN); Sanketh Bhat, Bangalore (IN)

(73) Assignee: General Electric Renovables Espana, S.L., Barcelona (ES)

(*) Notice: Subject to any disclaimer, the term of this patent is extended or adjusted under 35 U.S.C. 154(b) by 0 days.

(21) Appl. No.: 17/165,302

(22) Filed: Feb. 2, 2021

(65) Prior Publication Data

US 2021/0239094 A1 Aug. 5, 2021

(30) Foreign Application Priority Data

Feb. 3, 2020 (EP) .................................. 20155135

(51) Int. Cl.
*F03D 7/04* (2006.01)
*F03D 17/00* (2016.01)
*F03D 13/30* (2016.01)

(52) U.S. Cl.
CPC ............. *F03D 7/045* (2013.01); *F03D 7/048* (2013.01); *F03D 17/00* (2016.05); *F03D 13/30* (2016.05); *F05B 2260/84* (2013.01); *F05B 2270/32* (2013.01); *F05B 2270/806* (2013.01); *F05B 2270/8042* (2013.01)

(58) Field of Classification Search
CPC .......... F03D 7/045; F03D 7/048; F03D 17/00; F03D 13/30; F05B 2260/84; F05B 2270/32; F05B 2270/8042; F05B 2270/806; Y02E 10/72

See application file for complete search history.

(56) References Cited

U.S. PATENT DOCUMENTS

| | | | |
|---|---|---|---|
| 7,941,304 B2 * | 5/2011 | Gundling | G06F 30/00 703/6 |
| 9,587,628 B2 | 3/2017 | Satish et al. | |
| 9,714,085 B2 * | 7/2017 | White | B64C 27/006 |
| 2013/0094961 A1 * | 4/2013 | Couchman | F03D 7/042 416/31 |
| 2015/0240789 A1 * | 8/2015 | Lu | F03D 17/00 702/45 |

(Continued)

FOREIGN PATENT DOCUMENTS

| | | | | |
|---|---|---|---|---|
| CN | 106704103 A | * | 5/2017 | ............. F03D 7/028 |
| DE | 102006014121 A1 | * | 12/2006 | ............. F03D 7/028 |

(Continued)

OTHER PUBLICATIONS

Avagliano et al. DE102006014121A1_English Machine Translation, Translated by EPO Sep. 26, 2022 (Year: 2006).*
EPO Search Report, dated Aug. 4, 2020.

*Primary Examiner* — J. Todd Newton
*Assistant Examiner* — Wayne A Lambert
(74) *Attorney, Agent, or Firm* — Dority & Manning, P.A.

(57) ABSTRACT

A method to operate a wind turbine is provided, the method including determining a correction model associated with the wind turbine, determining a corrected turbulence intensity parameter associated with the wind turbine based on the correction model, and operating the wind turbine based on the corrected turbulence intensity parameter.

14 Claims, 7 Drawing Sheets

(56) References Cited

U.S. PATENT DOCUMENTS

2017/0306926 A1* 10/2017 Deshpande .......... G01M 5/0016
2018/0223808 A1* 8/2018 Spruce .................... F03D 17/00
2021/0262441 A1* 8/2021 Jacobsen ................. F03D 7/046
2022/0034296 A1* 2/2022 Messing ............... F03D 7/0292

FOREIGN PATENT DOCUMENTS

WO    WO 2017/106323 A1    6/2017
WO    WO-2018008571 A1 *   1/2018  ............. F03D 17/00

* cited by examiner

TURBULENCE INTENSITY ESTIMATION

FIELD

The present subject matter relates generally to a method to operate a wind turbine, a method to site a wind turbine, a wind turbine, a system for operating a wind turbine, and a wind farm including at least one wind turbine and a wind farm controller.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known aerodynamics principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

There is a goal to improve wind turbine operation and wind turbine siting. Turbulence intensity is an important wind characterisation parameter for wind turbine operation and wind turbine siting. Turbulence intensity estimated using wind speed data such as rotor effective wind speed can be used as a basis for wind turbine control. Turbulence intensity estimated from reference wind speed information such as met mast wind sensor data can be used as a basis for wind turbine siting. Accordingly, there is a challenge to improve turbulence intensity estimation for efficient wind turbine operation and optimal wind turbine siting.

BRIEF DESCRIPTION

Aspects and advantages of the invention will be set forth in part in the following description, or may be obvious from the description, or may be learned through practice of the invention.

In an aspect, the present disclosure is directed to a method of operating a wind turbine the method including determining a correction model associated with the wind turbine, determining a corrected turbulence intensity parameter associated with the wind turbine based on the correction model, and operating the wind turbine based on the corrected turbulence intensity parameter.

In an aspect, the present disclosure is directed to a method of siting a wind turbine at a new site, the method including determining a site correction model, determining an adjusted turbulence intensity parameter associated with the wind turbine at the new site, and siting the wind turbine at the new site based on the adjusted turbulence intensity parameter.

In an aspect, the present disclosure is directed to a method of siting a new wind turbine, the method including determining a site correction model, determining an adjusted turbulence intensity parameter that is associated with the new wind turbine based on the site correction model, and siting the new wind turbine based on the adjusted turbulence intensity parameter.

In an aspect, the present disclosure is directed to an apparatus including a wind turbine including at least two rotor blades, and a model-based controller configured for determining rotor averaged wind speed, wherein the wind turbine is operated according to an aspect or sited according to an aspect described herein.

In an aspect, the present disclosure is directed to a wind farm including at least one wind turbine, and a wind farm controller, the wind farm controller including a processor configured to perform the method according aspects described herein.

In an aspect, the present disclosure is directed to a system for operating a wind turbine, the system including a processor configured to perform the method according to aspects described herein.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
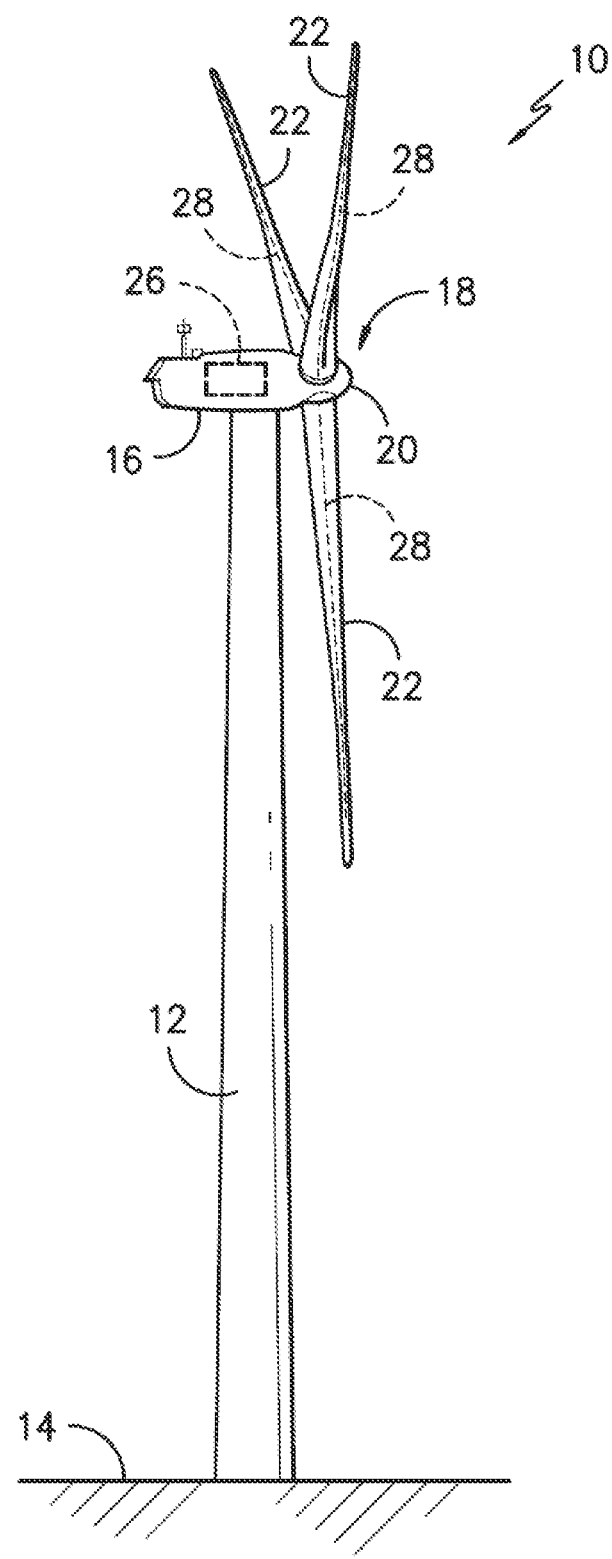
FIG. 1 illustrates a perspective view of a wind turbine.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16.

As shown in FIG. 1, the rotor 18 includes a rotatable hub 20 and at least one rotor blade 22 coupled to and extending outwardly from the hub 20. For example, in the illustrated embodiment, the rotor 18 includes three rotor blades 22.

However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the components. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals.

Figure 2:
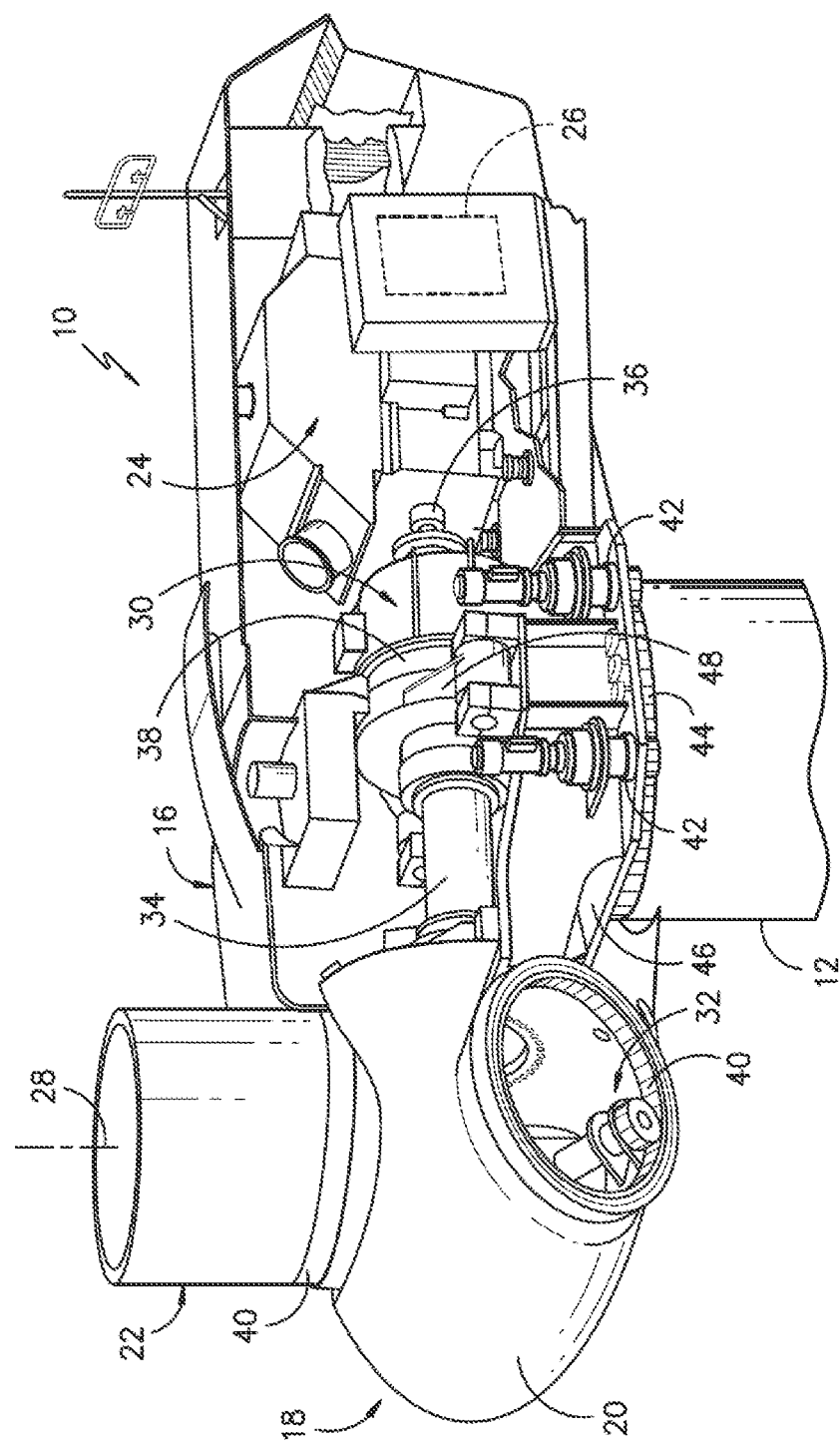
FIG. 2 illustrates a simplified, internal view of a nacelle of a wind turbine.

Referring now to FIG. 2, a simplified, internal view of one embodiment of the nacelle 16 of the wind turbine 10 shown in FIG. 1, particularly illustrating the drivetrain components thereof, is illustrated. More specifically, as shown, the generator 24 may be coupled to the rotor 18 for producing electrical power from the rotational energy generated by the rotor 18. The rotor 18 may be coupled to the main shaft 34, which is rotatable via a main bearing (not shown). The main shaft 34 may, in turn, be rotatably coupled to a gearbox output shaft 36 of the generator 24 through a gearbox 30. The gearbox 30 may include a gearbox housing 38 that is connected to the bedplate 46 by one or more torque arms 48. More specifically, in certain embodiments, the bedplate 46 may be a forged component in which the main bearing (not shown) is seated and through which the main shaft 34 extends. As is generally understood, the main shaft 34 provides a low speed, high torque input to the gearbox 30 in response to rotation of the rotor blades 22 and the hub 20. Thus, the gearbox 30 thus converts the low speed, high torque input to a high speed, low torque output to drive the gearbox output shaft 36 and thus, the generator 24.

Each rotor blade 22 may also include a pitch adjustment mechanism 32 configured to rotate each rotor blade 22 about its pitch axis 28 via a pitch bearing 40. Similarly, the wind turbine 10 may include one or more yaw drive mechanisms 42 communicatively coupled to the controller 26, with each yaw drive mechanism(s) 42 being configured to change the angle of the nacelle 16 relative to the wind (e.g., by engaging a yaw bearing 44 of the wind turbine 10).

In embodiments described throughout this disclosure, such as embodiments exemplarily explained in reference to FIGS. 3A, 4, 5A, 5B, 5C, 5D, which can be combined with other embodiments described herein, rotor effective wind speed data and/or wind turbine associated wind speed data may be substituted by and/or be in combination with other wind turbine associated wind speed data.

Wind turbine associated wind speed data may be derived from physical and/or virtual sensors. Examples of physical sensors include nacelle mounted anemometer. Physical sensors may be cup, propeller, ultrasonic, sonic or SODAR, and LIDAR type sensors. Virtual sensors may be derived from model-based controllers to provide rotor effective wind speed, blade estimated wind speed, or the like.

Other wind turbine associated wind speed data includes data derived therefrom, such as subsampled data, turbulence intensity parameter, length scale parameter, or the like.

Other wind turbine associated wind speed data also includes constitutive data such rotor speed, blade pitch angle, wind turbine power coefficient, generator power, power output of the wind turbine, generator speed, generator torque, or the like.

In an exemplary embodiment, wind turbine associated wind speed is rotor effective wind speed based at least on turbine power output, rotor speed and blade pitch.

In embodiments described throughout this disclosure, such as embodiments exemplarily explained in reference to FIGS. 3A, 3B, 4, 5A, 5B, 5C, 5D, which can be combined with other embodiments described herein, a first plurality of wind data may refer to rotor effective wind speed data, wind turbine associated wind speed data, or existing site(s) associated wind speed data. For a first plurality of wind data referring to rotor effective wind speed data or wind turbine associated wind speed data, the first plurality of wind data may refer to the same or different wind turbine as the wind turbine that a third plurality of wind data is associated with.

Figure 4A:
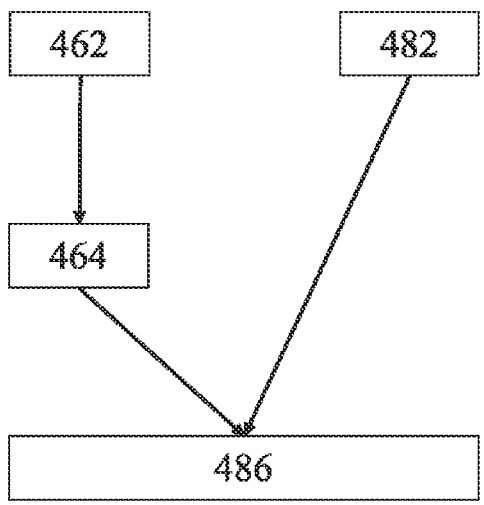
FIG. 4A illustrates a method of calibrating a correction model according to the present disclosure.

In an exemplary embodiment, the first plurality of wind data is the same as the wind turbine associated wind speed data described with exemplary reference to FIG. 4A.

In an exemplary embodiment, the second plurality of wind data is the same as the reference wind speed information described with exemplary reference to FIG. 4A.

Figure 3A:
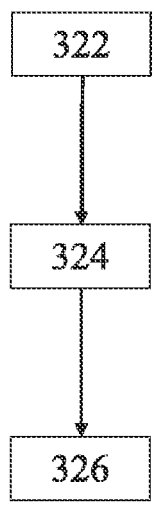
FIG. 3A illustrates a method of operating a wind turbine according to the present disclosure.

In an exemplary embodiment, the third plurality of wind data is the same as the rotor effective wind speed data described with exemplary reference to FIG. 3A.

In embodiments where the wind turbine associated with the first and third plurality of wind data are the same, the correction model performs better. In embodiments, where the wind turbine associated with the first and third plurality of wind data are different, the correction model is more robust.

In embodiments described throughout this disclosure, such as embodiments exemplarily explained in reference to FIG. 3A, wind turbine operational parameters may include blade pitch angle, generator speed, converter speed, generator power, rotor speed, requested torque, generator torque, aerodynamic torque, wind speed or the like.

In embodiments described throughout this disclosure, such as embodiments exemplarily explained in reference to FIGS. 3A, 3B, 4, 5A, 5B, 5C, and 5D, a second plurality of wind data may refer to reference wind speed data, model or information.

FIG. 3A illustrates a method of operating a wind turbine according to the present disclosure. In typical embodiments, a correction model may be used to optimise existing wind turbines. Rotor effective wind speed data may be received 322. For example, rotor speed may be measured, with one or more sensors. Power output may be measured, with one or more sensors. Calculation may be made, by a controller such as a model-based controller, that puts the measured rotor speed, measured power output and/or other operating parameters of a wind turbine in relation so as to determine rotor effective wind speed. The controller, such as a model-based controller may be stored on some data storage medium at the wind turbine or at a central controller such as a wind farm controller.

Other operating parameters of a wind turbine may be blade pitch angle for example. Data connection may exist, wifi, cable or the like, to transmit the data. Rotor effective wind speed data and/or data for determining rotor effective wind speed data may be transmitted to a controller such as a wind farm controller or the like. The controller may have a processor and some data storage medium, volatile or non-volatile.

With exemplary reference to FIG. 3A, a corrected turbulence intensity parameter may be determined based on the received wind speed data and a correction model 324. A correction model may be for example a transfer function. The correction model may be stored on a data storage medium, which may be for example, removeable or non-removeable, and may be at a central wind farm controller or some other data storage site. Data connection may exist, wifi, cable or the like, to transmit data, such as the correction model, to a controller.

In an example, calculations are made, by a controller, based on the received rotor effective wind speed data to determine a corrected turbulence intensity parameter. The controller can have a processor and some data storage medium, volatile or non-volatile. The corrected turbulence intensity parameter may be stored on a data storage medium, for example at a wind turbine, such as the wind turbine from which the rotor effective wind speed data was received, at some central controller, such as a wind farm controller, or some other data storage site.

The correction model provides a relationship between spatially-averaged wind data, e.g. rotor effective wind speed data based turbulence intensity, and point-equivalent wind data, e.g. meteorological wind speed data based turbulence intensity. Accordingly, a corrected turbulence intensity parameter may be determined from the received rotor effective wind speed data.

Calculation of the corrected turbulence intensity parameter may be performed, by the controller, in an online or recursive manner, for example at regular time intervals such as every 10 minutes based on the latest received rotor effective wind speed data, in particular, rotor effective wind speed data of the last 10 minutes.

Additionally, or alternatively, calculation of the corrected turbulence intensity parameters may be performed, by the controller, in an offline manner such as one-off or irregularly, for example by calculating based on historical rotor effective wind speed data, such as, of a previous day, week, month, year or anytime period not considered as the most recent.

Accordingly, online correction has the advantage of optimising power production and load control such as more precise control strategies.

Offline correction has the advantage of improving or correcting life estimation, such damage equivalent load estimation or remaining turbine lifespan, thus adapting load management and power production management according to corrected life estimation information.

With exemplary reference to FIG. 3A, an operational parameter, such as blade pitch angle or generator torque, of the wind turbine may be determined based on the corrected turbulence intensity parameter 326. For example, a corrected turbulence intensity parameter may be stored on a data storage medium. A data connection may exist, internal data connection such as within a machine or on a processor, or external connections such as cable, wifi or the like, to transmit data to a controller. A controller, such as a model-based controller, may retrieve, over a data connection such as wifi, cable or the like, the stored corrected turbulence intensity parameter. Calculation may be made, by the controller, to determine an operational parameter based on the corrected turbulence intensity. The calculated operational parameter may be stored on a data storage medium.

The controller may transmit a suitable wind turbine control signal that corresponds to the determined operational parameter, through a data connection, to control components, such as a pitch adjustment mechanism, a generator side converter, nacelle yaw drive, generator contactor or the like. Tus, an operational parameter can be determined or the wind turbine can be operated based on the corrected turbulence intensity parameter.

The corrected turbulence intensity parameter reflects wind conditions experienced by the wind turbine more accurately. Thus, by determining an operational parameter of the wind turbine based on the corrected turbulence intensity parameter, improved control of the wind turbine is achieved. For example, improved control of power output, such as higher power production is achieved. In another example, better control of structural loading, such as fatigue loads or extreme loads, on the wind turbine due to turbulence or changing wind speeds is achieved.

An improved estimation of turbulence intensity, such as the corrected turbulence intensity parameter, provides the advantage of maximising the operating life of the wind turbine, for example by better maintaining the operation of the turbine within designed load limits. An improved estimation of turbulence intensity also has the advantage of maximising power production, for example by strategically taking advantage of specific turbulence conditions to maximise power production.

In this way, an operational parameter of a wind turbine, such as operation of an existing wind turbine, may be improved. Accordingly, efficient wind turbine operation is achieved.

A correction based on a correction model may be understood as correcting spatially-averaged measure of turbulence intensity, such as a rotor effective wind speed based turbulence intensity, to obtain a point equivalent estimate of turbulence intensity, for example as described by embodiments described with exemplary reference to FIG. 3A.

Accordingly, a corrected turbulence intensity parameter may be better than a turbulence intensity parameter that is calculated based on rotor effective (or existing wind turbine associated) wind speed data and that is calculated without the use of the correction model.

For example, a correction, using the described correction model, to a turbulence intensity parameter that is calculated, using a controller, based on a wind turbine associated wind speed data, such as the received rotor effective wind speed data, may correct for effects such as vertical extrapolation, for example, such as caused by differences between a height at which a reference wind speed information is measured and a height at which a wind turbine associated wind speed data, such as the rotor effective wind speed data, is determined, and/or correct for effects such as horizontal extrapolation.

A correction may correct for effects such as seasonal and long-term trends, changes and/or variations. A correction may correct for effects such as the effect of operating wind turbine wakes. Accordingly, a correction model may be used to correct wind speed data from a wind turbine associated wind speed data such as rotor effective wind speed data.

Figure 3B:
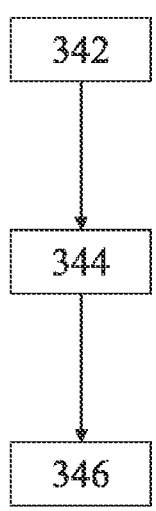
FIG. 3B illustrates a method of siting a wind turbine according to the present disclosure.

FIG. 3B illustrates a method of siting a wind turbine according to the present disclosure. There is provided a method of developing a wind farm which may include a method of siting a wind turbine. In embodiments, a site correction model is used to optimise new wind turbine(s) and/or new wind farm(s). Wind speed data associated with a site, such as a new site or new wind farm, may be received 342. For example, wind speed is measured, with one or more sensors, and stored on some data storage medium, volatile or non-volatile. A mast-mounted anemometer, for example a sonic anemometer mounted on a meteorological mast, may be such a sensor. The sensor may be at the new site or the new wind farm. Data connection may exist, wifi or cable or the like, to transmit the data from the one or more sensors to a data storage medium. The data storage medium may be at the new site or new wind farm, or at a remote data centre.

With exemplary reference to FIG. 3B, an adjusted turbulence intensity parameter may be determined based on the received new site associated wind speed data and a site correction model 344. The site correction model may be, for example, a transfer function. In an exemplary embodiment, the site correction model, described here with exemplary reference to FIG. 3B, is the same as the site correction model described with exemplary reference to FIG. 4B.

The site correction model may be stored on a data storage medium, which may be for example, removeable or non-removeable, and may be at a central wind farm controller or some other data storage site. Data connection may exist, wifi, cable or the like, to transmit data, such as the site correction model and/or the new site associated wind speed data, to a controller. In an example, calculations are made, by the controller, based on the received new site associated wind speed data to determine an adjusted turbulence intensity parameter. The controller can have a processor and some data storage medium, volatile or non-volatile. The adjusted turbulence intensity parameter may be stored on a data storage medium, for example at a data storage centre.

Accordingly, an adjusted turbulence intensity parameter may be better than a turbulence intensity parameter that is calculated based on new site associated wind speed data and that is calculated without the use of the site correction model.

For example, an adjustment, using the described site correction model, to a turbulence intensity parameter that is calculated, using a controller, based on new site associated wind speed data may correct for effects such as vertical extrapolation, for example, such as caused by differences between a height at which the new site associated wind speed data is measured and a height at which a new wind turbine operates, and/or horizontal extrapolation.

An adjustment may correct for effects such as seasonal and long-term trends, changes and/or variations. An adjustment may correct for effects such as the effect of operating wind turbine wakes. Accordingly, a site correction model may be used to correct wind speed data from a future wind farm or a new site.

In this way, a siting parameter of a new wind turbine, such as at the new site, may be improved. Accordingly, new wind turbine siting is optimised. An adjustment based on a site correction model may be understood as adjusting point measures of turbulence intensity, such as those from a meteorological mast-mounted anemometer, to determine an operationally relevant parameterisation of turbulence intensity, for example as described by embodiments described with exemplary reference to FIG. 3B.

Thus, a turbulence intensity parameter determined from wind speed data associated with a new site, such as meteorological mast-mounted anemometer based wind speed data, may be adjusted to determine an equivalent spatially-averaged turbulence intensity parameter, such as a turbulence intensity parameter associated with a new wind turbine, based on a correction model.

In some embodiments, an adjusted turbulence intensity parameter may be understood as identical to a corrected turbulence intensity parameter. Such an adjusted turbulence intensity parameter may apply in cases where wind turbine(s) already exist and new wind turbine or new wind farm may be wind turbines installed at the same site as existing wind turbines or proximate to existing wind turbine(s).

With exemplary reference to FIG. 3B, a siting parameter of a new wind turbine may be determined based on the adjusted turbulence intensity parameter 346. For example, an adjusted turbulence intensity parameter may be stored on a data storage medium. A data connection may exist, internal data connection such as within a machine or on a processor, or external connections such as cable, wifi or the like, to transmit data to a controller.

A simulator, such as aero-elastic simulator, may retrieve, over a data connection such as wifi, cable or the like, the stored corrected turbulence intensity parameter. Calculation may be made, by the simulator, to determine a siting parameter based on the adjusted turbulence intensity. The calculated siting parameter may be stored on a data storage medium. A new wind turbine may be installed based on the calculated siting parameter. Thus, a siting parameter can be determined or a new wind turbine can be sited based on the adjusted turbulence intensity parameter.

The adjusted turbulence intensity parameter may be used to determine optimal characteristics of a new wind turbine. Examples of a siting parameter may be rated power, location, hub height, structural loading capacity characteristics or the like. An advantage is that a new wind turbine is optimised to the local wind conditions. Accordingly, turbulence intensity estimation is improved and optimal wind turbine siting is achieved.

The embodiments described with exemplary reference to the site correction model and FIG. 3B may be practised either in association with, or independent of the embodiments described with exemplary reference to any of FIGS. 3A and 4A. For example, a controller may apply the site correction model to determine an adjusted turbulence intensity parameter to determine a siting parameter of a new wind turbine without or independent of a controller receiving rotor effective wind speed data, a controller determining an operational parameter of a wind turbine, or a controller calibrating a correction model.

FIG. 4A illustrates a method of calibrating a correction model according to the present disclosure. In typical embodiments, the correction model may be calibrated as follows. Wind speed data associated with a wind turbine may be received 422. In embodiments, the received wind speed data associated with a wind turbine as described here in embodiments exemplarily explained in reference to FIG. 4A may be the same as the received rotor effective wind speed described in embodiments exemplarily explained in reference to FIG. 3A.

More than one wind turbine associated wind speed data may be received, such as rotor effective wind speed, nacelle mounted wind sensor wind speed data and the like. Increasing the amount of data for calibration, such as using more than one source of wind turbine associated wind speed data to calibrate the correction model can improve the performance of the correction model.

For example, more data for calibration provides a wider range of parameters such as turbulence intensity, and length scale, over which to calibrate reference wind speed information and wind turbine associated wind speed data.

With exemplary reference to FIG. 4A, in an embodiment, rotor effective wind speed data is received 422. For example, rotor speed may be measured, with one or more sensors. Power output may be measured, with one or more sensors. Calculation may be made, by a controller such as a model-based controller, that puts the measured rotor speed, measured power output and/or other operating parameters of a wind turbine in relation so as to determine rotor effective wind speed. The controller, such as a model-based controller may be stored on some data storage medium at the wind turbine or at a central controller such as a wind farm controller.

Other operating parameters of a wind turbine used to determine rotor effective wind speed data may include blade pitch angle. Data connection may exist, wifi, cable or the like, to transmit data, such as the received wind turbine associated wind speed data. Wind turbine associated wind speed data and/or data for determining wind turbine associated wind speed data may be transmitted to a controller. The controller can have a processor and some data storage medium, volatile or non-volatile to process and store the wind turbine associated wind speed data.

With exemplary reference to FIG. 4A, a wind turbine associated wind characterisation quantity may be determined based on the received wind turbine associated wind speed data 424. For example, data connection may exist, wifi, cable or the like, to transmit data, such as the wind turbine associated wind speed data, from a data storage medium to a controller.

Calculation can made, by the controller, based on the received wind turbine associated wind speed data, to determine a wind turbine associated wind characterisation quantity. A wind turbine associated wind characterisation quantity may be parameters such as turbulence intensity, length scale, vertical shear, wind spectrum or the like. The wind turbine associated wind characterisation quantity may be stored, by the controller, on a storage medium.

With exemplary reference to FIG. 4A, in an embodiment, wind spectrum, turbulence intensity and length scale wind characterisation quantities are calculated, by a controller, based on received wind turbine associated rotor effective wind speed data, and stored, by the controller, on a data storage medium, volatile or non-volatile.

With exemplary reference to FIG. 4A, reference wind speed information may be received 442. The reference wind speed information may be received over a data connection, such as wifi, cable, or the like, and stored on a data storage medium, volatile or non-volatile. In an exemplary embodiment, reference wind speed information is obtained by measurement from wind speed sensor(s), such as 2D sonic anemometer, mounted on a meteorological mast.

In an exemplary embodiment, the wind speed sensor for reference wind speed information may be at the same wind farm site as the wind turbine that is associated with the wind turbine associated wind speed data that is described in embodiments exemplarily explained in reference to FIG. 4A.

In an exemplary embodiment, the reference wind speed information is obtained from a set of aeroelastic simulations. The reference wind speed information may exemplarily extend over the same time period(s) as the wind turbine associated wind speed data.

With exemplary reference to FIG. 4A, reference wind characterisation quantity may be determined based on the received reference wind speed information 444. For example, data connection may exist, wifi, cable or the like, for a controller to retrieve the reference wind speed information. The controller may calculate, using a processor, at least one reference wind characterisation quantity based on the received reference wind speed information, and store the at least one calculated reference wind characterisation quantity on a data storage medium, volatile or non-volatile. In an exemplary embodiment, the controller calculates the same kind of wind characterisation quantities for the reference wind speed data 444, as for the wind turbine associated wind speed data 424. In an exemplary embodiment, the controller calculates a wind spectrum, turbulence intensity, and length scale characterisation quantities using the reference wind speed information.

With exemplary reference to FIG. 4A, based on the wind characterisation quantity associated with the wind turbine and the reference wind characterisation quantity, the correction model may be calibrated 446. For example, the controller may calculate a correction model, using a processor, based on the wind characterisation quantity associated with the wind turbine and the reference wind characterisation quantity, and store the correction model on a data storage medium, volatile or non-volatile.

In an exemplary embodiment, the correction model is a spectral correction model. A spectral correction model is exemplarily a transfer function between a wind spectrum of the wind turbine associated wind speed data, and a wind spectrum of the reference wind speed information. In embodiments, the correction model is a transfer function in the frequency domain. In embodiments, the correction model is calibrated, by the controller, using non-linear regression.

In an exemplary embodiment, the controller calibrates the correction model, using a processor, as a function of at least one of the following: wind speed, turbulence intensity, and length scale.

By providing a robust mapping of the reference wind spectrum to wind turbine associated wind spectrum, and vice versa, wind turbine associate wind speed data can be used to obtained a corrected turbulence intensity, and/or reference wind speed information can be used to obtained an adjusted turbulence intensity.

Accordingly, turbulence intensity estimation is improved and efficient wind turbine operation is achieved.

Figure 4B:
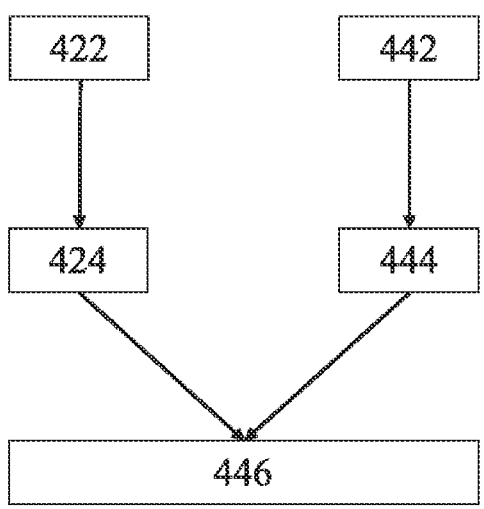
FIG. 4B illustrates a method of calibrating a site correction model according to the present disclosure.

FIG. 4B illustrates a method of calibrating a site correction model according to the present disclosure. In typical embodiments, the site correction model may be calibrated as follows. Wind speed information associated with existing site(s), such as wind speed information from a meteorological mast-mounted anemometer at existing wind farm(s), may be received 462.

With exemplary reference to FIG. 4B, in an embodiment, wind speed data associated with existing site(s), such as collected by a meteorological mast-mounted sensor, for example at a potential new wind farm, or potential new site, is received 462. For example, wind speed may be measured, with one or more sensors. A sensor may be for example a 2D sonic anemometer. In some embodiments, the existing site(s) associated wind speed information is the same as the reference wind speed information, for example as described with exemplary reference to any of FIGS. 4A, 5A, 5B 5C, and 5D.

Data connection may exist, wifi, cable or the like, to transmit data, such as the received existing site(s) associated wind speed information. Existing site(s) associated wind speed information and/or data for determining existing site(s) associated wind speed information may be transmitted to a controller. The controller can have a processor and some data storage medium, volatile or non-volatile to process and store the existing site(s) associated wind speed information.

With exemplary reference to FIG. 4B, existing site(s) associated wind characterisation quantity or quantities may be determined based on the received existing site(s) associated wind speed information 464. For example, data connection may exist, wifi, cable or the like, to transmit information, such as the existing site(s) associated wind speed information, from a data storage medium to a controller. Calculation can made, by the controller, based on the received existing site(s) associated wind speed information to determine existing site(s) associated wind characterisation quantity or quantities. Existing site(s) associated wind speed information may be parameters such as turbulence intensity, length scale, vertical shear, wind spectrum or the like. The existing site(s) associated wind characterisation quantity or quantities may be stored, by the controller, on a storage medium.

With exemplary reference to FIG. 4B, in an embodiment, wind spectrum, turbulence intensity and length scale wind characterisation quantities are calculated, by a controller, based on received existing site(s) associated wind speed information, and stored, by the controller, on a data storage medium, volatile or non-volatile.

With exemplary reference to FIG. 4B, corrected turbulence intensity parameter(s), or information for determining corrected turbulence intensity parameter(s) may be received 482. The corrected turbulence intensity parameter(s), or information for determining corrected turbulence intensity parameter(s) may be received over a data connection, such as wifi, cable, or the like, and stored on a data storage medium, volatile or non-volatile. In an exemplary embodiment, corrected turbulence intensity parameter(s) is or are determined as described by embodiments described with exemplary reference to FIG. 3A.

The corrected turbulence intensity parameter(s), or information for determining corrected turbulence intensity parameter(s) may exemplarily extend over the same time period(s) as the existing site(s) associated wind speed information.

In the case where information for determining corrected turbulence intensity parameter(s) is received, a controller may calculate, using a processor, corrected turbulence intensity parameter(s) based on the received information for determining corrected turbulence intensity parameter(s), and store the calculated corrected turbulence intensity parameter(s) on a data storage medium, volatile or non-volatile. In some embodiments, the same wind characterization quantities, as the wind characterization quantities described with exemplary reference to step 464 of FIG. 4B, e.g. existing site(s) associated wind characterisation quantity or quantities, e.g. turbulence intensity, length scale, and average wind speed are determined or received in step 482.

With exemplary reference to FIG. 4B, based on the wind characterisation quantity or quantities, such as turbulence intensity, associated with existing site(s) and corrected turbulence intensity parameter(s), the site correction model may be calibrated 486. For example, the controller may calculate a site correction model, using a processor, based on the wind characterisation quantity or quantities associated with existing site(s) and the corrected turbulence intensity parameter(s), and store the site correction model on a data storage medium, volatile or non-volatile.

In an exemplary embodiment, the site correction model calibration is carried out based on other quantities such as length scale, average wind speed, turbulence intensity or turbulence intensity bin, vertical wind shear or the like, for example as described in relation to the correction model described throughout this specification, in addition to existing site associated wind characterization quantity or quantities, and corrected turbulence intensity parameter(s).

In an example, the controller calibrates the site correction model, using a processor, as a function of at least one of the following: wind speed, turbulence intensity or turbulence intensity bin, and length scale.

In an exemplary embodiment, the corrected turbulence intensity parameter(s) is associated with the same site(s) as the existing site(s) associated wind speed information.

By providing a robust mapping of existing site(s) associated wind speed information to adjusted turbulence intensity, and existing site(s) associated wind speed information can be used to obtained an adjusted turbulence intensity. Accordingly, turbulence intensity estimation is improved and optimal wind turbine siting is achieved.

Figure 5A:
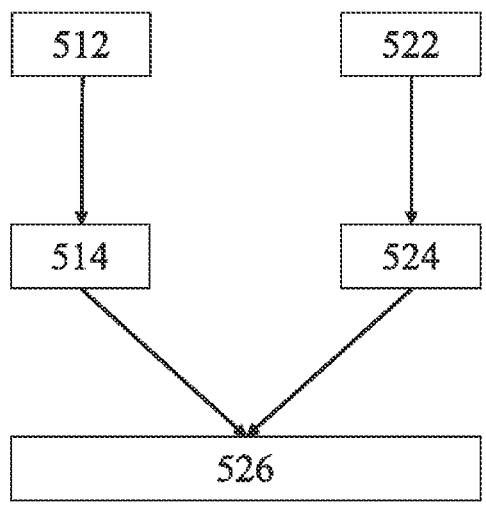
FIGS. 5A through 5D illustrate methods of calibrating a correction model according to the present disclosure.

FIG. 5A illustrates a method of calibrating the correction model according to the present disclosure. In embodiments, which can be combined with other embodiments described herein, such as embodiments exemplarily explained in reference to FIGS. 1, 2, 3A, 3B, 4, 5C and 5D, the correction model may be calibrated with wind spectrum models as follows. Wind speed data associated with a wind turbine, such as rotor effective wind speed obtained using a wind turbine model-based controller, may be received 512. For example, wind speed data associated with a wind turbine may be received over a data connection, such as wifi, cable or the like, and stored on a data storage medium, volatile or non-volatile.

With exemplary reference to FIG. 5A, a wind spectrum model associated with the wind turbine, such as a Kaimal wind spectrum model, may be determined based on each wind speed data received 514. For example, the received wind turbine associated wind speed data stored on the data storage medium, may be retrieved, over a data connection such as wifi, cable or the like, by a controller, using a processor. The controller can calculate a wind spectrum model, using a processor, based on the received wind turbine associated wind speed data, and store the calculated wind spectrum model on a data storage medium, volatile or non-volatile.

With exemplary reference to FIG. 5A, reference wind speed information, such as wind speed data from a meteorological mast, may be received 522. For example, reference wind speed information may be transmitted to a controller, over a data connection such as wifi, cable or the like. The reference wind speed information may be stored on a data storage medium, volatile or non-volatile.

With exemplary reference to FIG. 5A, a reference wind spectrum model, such as a Kaimal wind spectrum model, may be determined based on the received reference wind speed information 524, for example, a reference wind spectrum model for each received reference wind speed data 524. For example, the received reference wind speed information stored on the data storage medium, may be retrieved by a controller, using a processor. The controller can calculate a wind spectrum model, using a processor, based on the received reference wind speed information, and store the calculated wind spectrum model on a data storage medium, volatile or non-volatile.

With exemplary reference to FIG. 5A, a correction model, such as a spectral correction model, may be calibrated, for example using non-linear regression, based on the wind turbine associated and reference wind spectrum models 526. For example, the controller may calculate a correction model, using a processor, based on the wind turbine associated wind spectrum model and the reference wind spectrum model. The controller may store the correction model on a data storage medium, volatile or non-volatile. In an exemplary embodiment, the correction model is a spectral correction model.

Figure 5B:
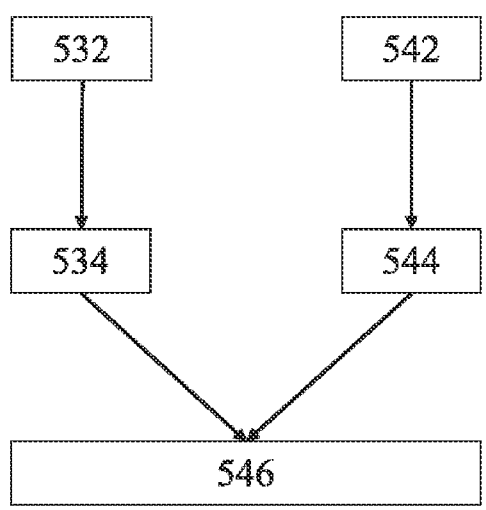
Figure 5C:
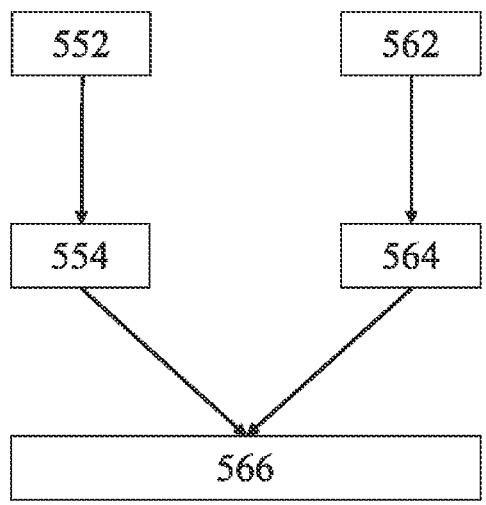
Figure 5D:
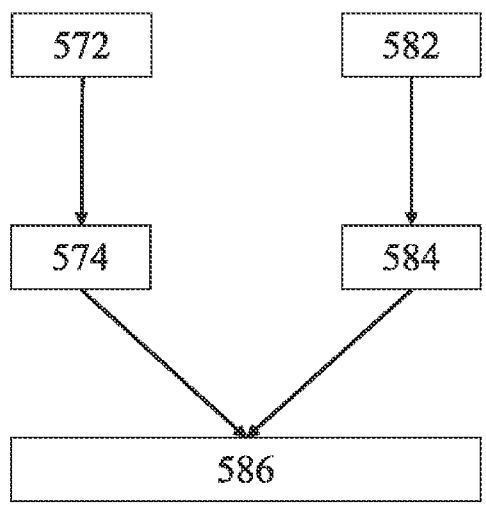

In embodiments exemplarily explained in reference to FIG. 5A as well as other figures, such as FIGS. 4, 5C, and 5D, wind spectrum can substitute wind spectrum model. For example, the controller may calculate a correction model based on a wind turbine associated wind spectrum and a reference wind spectrum instead of a wind turbine associated wind spectrum model and a reference wind spectrum model. A correction model, as calculated by a controller, has the effect that turbulence intensity estimation is improved, and efficient wind turbine operation or optimal wind turbine siting is achieved.

FIG. 5B illustrates a method of calibrating the correction model according to the present disclosure. In embodiments, which can be combined with other embodiments described herein, such as embodiments exemplarily explained in reference to FIGS. 1, 2, 3A, 3B, 4, 5C and 5D, the correction model may be calibrated with turbulence intensity parameters as follows. Wind speed data associated with a wind turbine, such as nacelle anemometer wind speed data, may be received 532. For example, wind speed data associated with a wind turbine may be received over a data connection, such as wifi, cable or the like, and stored on a data storage medium, volatile or non-volatile.

With exemplary reference to FIG. 5B, a turbulence intensity parameter, may be determined based on the received wind turbine associated wind speed data 534. For example, the received wind turbine associated wind speed data stored on the data storage medium, may be retrieved by a controller, using a processor. The controller can calculate a turbulence intensity parameter, using a processor, based on the received wind turbine associated wind speed data, and store the calculated turbulence intensity parameter on a data storage medium, volatile or non-volatile.

With exemplary reference to FIG. 5B, reference wind speed information, such as wind speed data from a set of aeroelastic simulations, may be received 542. For example, reference wind speed information may be transmitted to a controller, over a data connection such as wifi, cable or the like. The reference wind speed information may be stored on a data storage medium, volatile or non-volatile.

With exemplary reference to FIG. 5B, a turbulence intensity parameter may be determined based on the reference wind speed information received 544. For example, the received reference wind speed data stored on the data storage medium, may be retrieved, over a data connection such as wifi, cable or the like, by a controller, using a processor. The controller can calculate a turbulence intensity parameter, using a processor, based on the received reference wind speed data. The controller can store the calculated turbulence intensity parameter on a data storage medium, volatile or non-volatile.

With exemplary reference to FIG. 5B, a correction model, such as a transfer function, may be calibrated, for example using correction scaling, based on the wind turbine associated and reference turbulence intensity parameters 546. For example, the controller may calculate a correction model, using a processor, based on the wind turbine associated turbulence intensity parameter and the reference turbulence intensity parameter. The controller may store the correction model on a data storage medium, volatile or non-volatile. In an exemplary embodiment, the correction model is a ratio of the reference turbulence intensity parameter to the wind turbine associated turbulence intensity parameter, as a function of at least one of the following: wind speed, turbulence intensity, and length scale. In an exemplary embodiment, the turbulence intensity parameter is a ratio of variance of wind speed to mean of wind speed.

In embodiments exemplarily explained in reference to FIG. 5B as well as other figures, such as FIGS. 4, 5C, and 5D, the correction model is obtained using correction scaling or linear regression. A correction model as calculated by a controller has the effect that turbulence intensity estimation is improved, and efficient wind turbine operation or optimal wind turbine siting is achieved. Furthermore, a correction model as described in embodiments exemplarily explained in reference to FIG. 5B has the advantage of speed. Online or real-time correction of turbulence intensity may be improved accordingly.

FIG. 5C illustrates a method of calibrating the correction model according to the present disclosure. In embodiments, which can be combined with other embodiments described herein, such as embodiments exemplarily explained in reference to FIGS. 1, 2, 3A, 3B, 4, 5A and 5B, the correction model may be calibrated against reference data as follows. Wind speed data associated with a wind turbine, such as nacelle anemometer wind speed data, may be received 552. For example, wind speed data associated with a wind turbine may be received over a data connection, such as wifi, cable or the like, and stored on a data storage medium, volatile or non-volatile.

With exemplary reference to FIG. 5C, a wind characterisation quantity associated with the wind turbine, such as a length scale parameter, may be determined based on each received wind speed data 554. For example, the received wind turbine associated wind speed data stored on the data storage medium, may be retrieved by a controller, using a processor. The controller can calculate a wind characterisation quantity based on the received wind turbine associated wind speed data, and store the calculated wind characterisation quantity on a data storage medium, volatile or non-volatile.

With exemplary reference to FIG. 5C, a reference wind speed data, such as unwaked wind speed measurements from LIDAR sensor(s) at a wind farm, may be received 562. For example, the received reference wind speed data may be transmitted to a controller, over a data connection such as wifi, cable or the like. The reference wind speed data may be stored on a data storage medium, volatile or non-volatile.

With exemplary reference to FIG. 5C, a reference wind characterisation quantity, such as a Kaimal wind spectrum model, may be determined based on the wind speed data received 564. For example, the received reference wind speed data stored on the data storage medium, may be retrieved by a controller, using a processor. The controller can calculate a wind characterisation quantity, using a processor, based on the received reference wind speed data, and store the calculated wind characterisation quantity on a data storage medium, volatile or non-volatile.

With exemplary reference to FIG. 5C, a correction model, such as a scaling function, may be calibrated, for example using linear regression, based on the wind turbine associated and reference wind characterisation quantities 566. For example, the controller may calculate a correction mode, using a processor, based on the wind turbine associated wind characterisation quantity and the reference wind characterisation quantity. The controller may store the correction model on a data storage medium, volatile or non-volatile. In an exemplary embodiment, the correction model is a spectral correction model.

FIG. 5D illustrates a method of calibrating the correction model according to the present disclosure. In embodiments, which can be combined with other embodiments described herein, such as embodiments exemplarily explained in reference to FIGS. 1, 2, 3A, 3B, 4, 5A and 5B, the correction model may be calibrated against a reference model as follows. Wind speed data associated with a wind turbine, such as blade estimated wind speed obtained from a wind turbine model based controller, may be received 572. For example, wind speed data associated with a wind turbine may be received over a data connection, such as wifi, cable or the like, and stored on a data storage medium, volatile or non-volatile.

With exemplary reference to FIG. 5D, a wind characterisation quantity associated with the wind turbine, such as mean horizontal wind speed, may be determined based on each received wind speed data 574. For example, the received wind turbine associated wind speed data stored on the data storage medium, may be retrieved by a controller, using a processor. The controller can calculate a wind characterisation quantity, using a processor, based on the received wind speed data. The controller can store the calculated wind characterisation quantity on a data storage medium, volatile or non-volatile.

With exemplary reference to FIG. 5D, a reference wind speed model, such as a Mann spectral model, may be received 582. For example, reference wind speed model may be transmitted to a controller, over a data connection such as wifi, cable or the like. The reference wind speed model may be stored on a data storage medium, volatile or non-volatile.

With exemplary reference to FIG. 5D, a reference wind characterisation quantity, such as a power spectrum density, may be determined based on each wind speed model received 584. For example, the received reference wind speed model stored on the data storage medium, may be retrieved, over a data connection such as wifi, cable or the like, by a controller, using a processor. The controller can calculate a wind characterisation quantity, using a processor, based on the received reference wind speed data. The controller can store the calculated wind characterisation quantity on a data storage medium, volatile or non-volatile.

With exemplary reference to FIG. 5D, a correction model, such as a spectral correction model, may be calibrated, for example using non-parametric regression, based on the wind turbine associated and reference wind characterisation quantities 586. For example, the controller may calculate a correction model, using a processor, based on the wind turbine associated wind characterisation quantity and the reference wind characterisation quantity. The controller may store the correction model on a data storage medium, volatile or non-volatile.

In an exemplary embodiment, the correction model is a spectral correction model, as a function of at least one of the following: wind speed, turbulence intensity, and length scale. In an exemplary embodiment, the correction model is calculated using a non-linear regression model.

Figure 6:
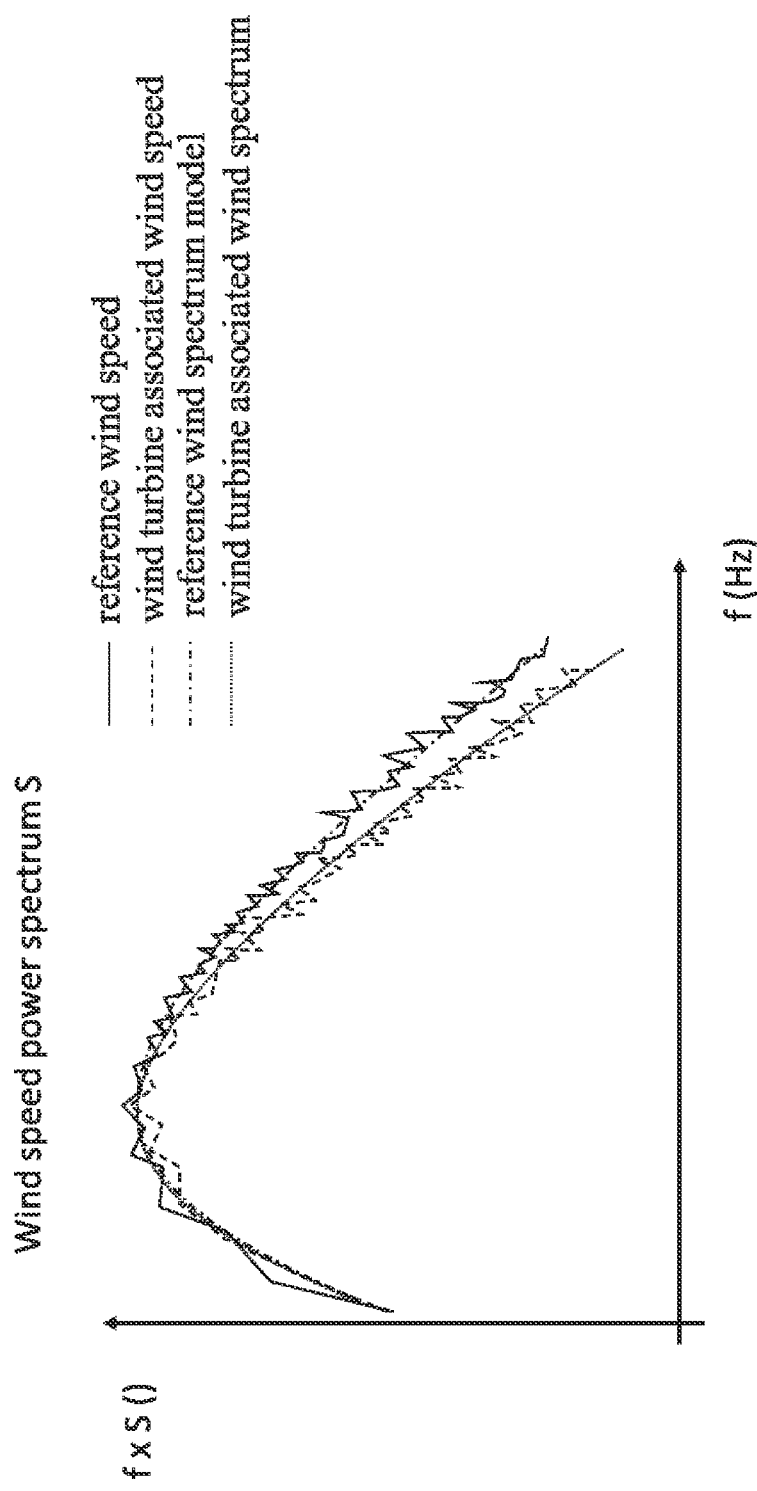
FIG. 6 illustrates an example according to the present disclosure.

FIG. 6 illustrates an example according to the present disclosure. In embodiments, the correction model is calibrated against reference data, using wind spectrum models, for operating an existing wind turbine. With exemplary reference to FIG. 6, the reference wind spectrum model may be determined, using a controller, based on the reference wind speed data seen. The wind turbine associated wind spectrum model may be determined, using a controller, based on the wind turbine associated wind speed data. Accordingly, the correction model may be calibrated, using a controller, based on the wind turbine associated wind spectrum model and reference wind spectrum model. In embodiments, a corrected turbulence intensity parameter may be determined, using a controller, based on the calibrated correction model, and received rotor effective speed data, e.g. obtained from an existing wind turbine. In embodiments, an operational parameter, e.g. target rotational speed, of the wind turbine may be determined, by a controller, based on the corrected turbulence intensity parameter. Accordingly, the wind turbine may be operated with at optimum power production level or with optimised lifespan.

Embodiments relating to wind characterisation quantities are described in the following. A wind characterisation quantity is generally a parameter or quantity derived from wind information, in particular wind speed data or wind speed model. A wind characterisation quantity may be understood as a derived quantity that characterises the wind information.

A wind characterisation quantity can be any of the following: wind spectrum, wind spectrum model, power spectrum density, turbulence intensity, turbulence intensity squared or the like, integral time scale, integral length scale, vertical wind shear, mean wind speed or any combination thereof.

In exemplary embodiments, at least one wind characterisation quantity is used. In an exemplary embodiment, wind characterisation quantity includes wind spectrum model, turbulence intensity and integral length scale.

The wind characterisation quantity may be derived based on a certain time length of wind data, such as a 10 minute, 5 minute, 15 minute, 30 minute or the like period.

Embodiments relating to operational parameters of a wind turbine are described in the following. Operational parameters may be related to load management. For example, the target rotation speed of the rotor may have an inverse relationship with turbulence intensity for maximizing the wind turbine lifespan and improving levelized cost of energy. In another example, wind turbine life odometer accuracy may be improved by retrospectively correcting load estimation based on corrected turbulence intensity.

Loads or component loads described herein are, for example, loads on the components of the wind turbine. The components of the wind turbine are, for example, those described with reference to FIGS. 1 and 2, such as rotor blade(s), tower, shaft, gearbox and generator. Loads or component loads may be extreme loads and/or fatigue loads.

Operational parameters may also be related to power performance optimization. For example, the use of the correction model to provide turbulence intensity estimates with lower uncertainty thus enabling the wind turbine to be operated closer to its rated power thus improving power production.

In other examples, power output may be maximised, or power output may be fixed at a constant power level or at the wind turbine's rated power. Maximising power output may be advantageous in variable speed operation for maximizing electricity production. In other examples, fixing power output may be advantageous when the grid requests a steady output.

Document U.S. Pat. No. 9,587,628B2 provides examples related to increased efficiency in terms of annual energy production during operation below rated power of the wind turbine. For instance, at low turbulences, the wind turbine is operated at a rotation speed (or a tip-speed-ratio) that includes a small speed deviation amount from the optimal rotation speed (or a tip-speed-ratio deviation amount), for instance, at a deviation amount of maximally 8% or even maximally 5%, and typically at least 1% or 2% of the optimal rotation speed (or the optimal tip-speed-ratio).

As understood herein, a speed deviation amount or a tip-speed-ratio deviation amount from the optimal rotation speed or the optimal tip-speed-ratio shall be understood as an intended deviation as disclosed herein. A deviation from the optimal rotation speed or the optimal tip-speed-ratio shall not be misunderstood as a deviation due to changing wind conditions wherein, however, the controller of the wind turbine may be configured to avoid any such deviation.

At higher turbulences, the wind turbine may be operated at a high deviation from the optimal rotation speed or the tip-speed-ratio, for instance, at a deviation amount of at least 5%, 10%, or even 15% from the optimal rotation speed or the optimal tip-speed-ratio.

Accordingly, an operational parameter of the wind turbine, such as the rotation speed, may be determined based on turbulence intensity.

Further embodiments relating to operational parameters of a wind turbine, which may be combined with other embodiments described herein, are described in the following. In a specific example, if the turbulence intensity estimated according to embodiments described herein is lower or higher than assumed, or lower than a turbulence intensity estimated in a conventional manner, then the wind turbine may be operated based on the turbulence intensity estimated according to embodiments described herein, for example, based on the corrected turbulence intensity.

Ina specific example, the turbulence intensity estimated, according to embodiments described herein, may be lower than assumed or lower than a turbulence intensity estimated in a conventional manner. In a specific example, the wind turbine is operating in a region between the variable speed or variable power output region of the power curve, and the rated power region or maximum power output of the power curve (knee region).

Ina specific example, based on a lower corrected turbulence intensity estimated, the wind turbine may be operated more aggressively. Control parameters such as pitch and speed of the rotor blade(s) may be operated. Transition between the variable speed region and the rated power speed region may be carried out smoothly. Operational parameters may be determined to capture power more aggressively while still managing loads within operational limits.

In the variable speed region, pitch may not be changing. In the variable speed region, rotor speed may be variable and may track optimal speed to maximise power output. In the rated power region, pitch may be changing. In the rated power region, rotor speed may be fixed to maintain constant power output.

In the transition region between the variable speed region and the rated power region, the start to changing the pitch may be delayed or the pitch may be changed in a controlled or slow manner rather than abruptly. In the transition region, the acceleration of the rotor speed may be slowed slowly or in a controlled manner rather than stopped abruptly.

According to embodiments described herein, the operational parameters may be determined, thus the wind turbine operated, based on the corrected turbulence intensity parameter. Operational parameters may include any other known operational parameters such as yaw direction and generator torque demand.

Embodiments relating to siting parameters of anew wind turbine are described in the following. Offline wind resource assessment or wind characterisation relates to the ability to build a database of the environmental conditions in order to draw conclusions for current asset or future projects. An accurate estimate of the spatial and temporal wind conditions that a blade experiences gives a better load estimate or better wind characterisation function Accordingly, improved turbulence intensity estimation can improve the siting of new turbines.

For example, measurements of wind characteristics, such as turbulence intensity, at a new wind farm site may be used to determine the load and performance characteristics of new wind turbines sited at the new farm site. Using a site correction model, adjusted wind characteristics, such as adjusted turbulence intensity parameter may be used to determine the load and performance characteristics of new wind turbines more accurately.

Accordingly, based on the adjusted wind characteristics, such as adjusted turbulence intensity, physical attributes, such as siting location rated power, or load capacity, of the new wind turbines may be determined more accurately/optimally, e.g. with less uncertainty/design margin.>

Embodiments relating to wind speed data associated with a wind turbine are described in the following. Wind speed data may be obtained by virtual or physical sensors. A virtual sensor may be based on operational and state parameters of the wind turbine, e.g. power produced, rotor speed, and blade pitch dynamics. A virtual sensor based on model based controllers may provide rotor effective wind speed, blade estimated wind speed, or the like.

Alternatively or in addition, blade estimated wind speed may be provided. A physical sensor may be an anemometer such as a cup or sonic anemometer. The anemometer may be placed on the nacelle of the wind turbine or on a mast at the height of a wind turbine.

Alternatively, or in addition, a SODAR and/or LIDAR measurement system may provide wind speed data. Each independent wind speed data received may improve the calibration of the correction model.

Therefore, any combination of wind turbine associated wind speed data may also be obtained and/or used.

Rotor effective wind speed may be understood as follows. A rotor effective wind speed may represent an average of the wind field over the rotor area. Rotor effective wind speed may also be understood as the average longitudinal wind speed component or spatial average of the wind field over the entire rotor plane. Rotor effective wind speed may be based on using the entire rotor as an anemometer.

Rotor-effective wind speed may be determined by considering the turbine model characteristics and several measured signals. Determining rotor effective wind speed may be understood as determining the magnitude of an undisturbed wind field that creates the (unique) combination of power production, rotational speed and pitch angle at the turbine.

A power balance estimator, Kalman filter based estimator, and/or an extended Kalman filter based estimator may be used to determine rotor effective wind speed. In some embodiments, wind turbine associated wind speed data such as rotor effective wind speed data may be pre-processed. For example, specific filters of the input signals, such as filtering high and/or low frequency content, and filtering specific frequencies (e.g. blade passage frequencies) may be performed.

Embodiments relating to reference wind speed data are described in the following. Reference wind speed data may be obtained from any of the following: aeroelastic simulations, large eddy simulation wind model, Mann spectral model, actual test measurements from a site, sensors on a meteorological tower (or Met Mast or meteorological mast), data from proximate weather station(s), experimental analogue such as a model in a wind chamber, weather forecast models, satellite-based climate data, or any combination thereof.

Descriptions relating to turbulence intensity areas follows. Turbulence is the random fluctuations of the wind vector in the atmosphere. Thus, turbulence intensity is a measure to describe the typical amplitude of the fluctuations over a specified time period. Turbulence intensity, TI may be measured as a ratio of the standard deviation of the wind speed magnitude, over a specified time period, e.g. 10 minutes, $\langle ws'^2 \rangle_{10\ min}$ divided by the average wind speed magnitude, e.g. over 10 minutes, $\langle WS \rangle_{10\ min}$, as given by the equation:

$$TI_{WS} = \frac{\sqrt{\langle ws'^2 \rangle_{10\ min}}}{\langle Ws \rangle_{10\ min}}.$$

In the example, the average and standard deviation of wind speed is taken over a 10 minute period. Turbulence intensity may be expressed in percents. Turbulence intensity may range from 0% up to 50%. An average turbulence intensity value in the atmosphere at wind turbine heights may be between 10% and 20%.

A 10 minute time scale, such as described elsewhere in this specification, is often used to evaluate turbulence intensity, but shorter or longer timescales may equally be used, for example a time period anywhere from 5 minutes to 30 minutes, such as 15 minutes, 20 minutes etc.

A meteorological mast with a cup anemometer or a sonic anemometer located at the height of the wind turbine are possible ways to measure turbulence intensity.

Embodiments relating to wind spectrum model estimation, particularly for the reference wind speed data, are described in the following. An initial database may be formed as follows. A large database of 10 minute long longitudinal wind speed component, $u_x$, and transversal wind speed component, $u_y$, time series may be acquired.

A 2D sonic anemometer may provide longitudinal and transversal wind speed data. Wind speed data may have a sampling rate of 1 Hz or higher. A data quality check, for example checking that the sensor is functioning appropriately, and/or in some cases for example for reference wind speed measurements, checking that the sensor or sensor data is unwaked. A flow that represents free stream conditions may be considered unwaked. A sensor that is unwaked may be understood as upstream from wake producing structures.

Accordingly, an initial database may be formed.

For 2D wind speed data, the longitudinal wind speed may be determined as follows. For each time series, a projection on the longitudinal direction may be determined. The two dimensional 10 minute average wind vector, $\vec{U}_{2D}$ may be given as x- and y-wind speed components, according to the formula: $\vec{U}_{2D}=[U_x, U_y]$. Accordingly, a longitudinal vector, $\vec{t}$ may be obtained by normalising the two dimensional 10 minute average wind vector, $\vec{U}_{2D}$ by its magnitude, according to the equation: $\vec{t}=\vec{U}_{2D}/\|\vec{U}_{2D}\|$.

Accordingly, the time series of longitudinal wind speeds, u(t) may be obtained by projecting the x- and y-wind speed components onto the component vectors, $u_x(t)$ and $u_y(t)$ as given by the equation: $u(t)=[u_x(t),u_y(t)] \cdot \vec{t}$. Thus, the longitudinal wind speed, u(t) may be determined.

Detrending may be performed as follows. Linear detrending may be performed for each time series as follows. A least square regression, $\tilde{u}(t)$ of the longitudinal vector, u(t) may be determined, according to the formula: $\tilde{u}(t)=at+u_0$, where a and u0 are fitted regression parameters. Accordingly, the detrended time series, $u_{DT}(t)$ may be given by the formula $u_{DT}(t)=u(t)-at$.

Power spectra may be determined using Fourier transform. A Fourier transform may be performed for each time series as follows. A single sided power spectrum, $\hat{u}_{DT}$ may be obtained by applying a fast Fourier transform to the detrended time series, $u_{DT}(t)$, according to the formula: $\hat{u}_{DT}=FFT(u_{DT}(t))$.

Binning may be performed as follows. One or more bin dimensions may be used. A most exemplary first bin dimension is average wind speed. Additional optional bin dimension may be used. A second bin dimension may exemplarily be the turbulence intensity. A third bin dimension may exemplarily be the atmospheric stability. Other binning parameters may be used. A different number of bins and/or combination of binning parameters may also be used.

Accordingly, the power spectra belonging to a given bin may be averaged. Spectral averages should be done over similar conditions, conditions such as wind speed and turbulence intensity. For example, all single sided power spectra belonging to a given bin may be averaged. The average value of each bin may be used for spectral fitting.

Spectral fitting may be performed as follows. For each bin or bin combination, a Kaimal model fit may be used to obtain the integral length scale. Spectral fitting may be performed by defining a Kaimal fitting function. The minimum and maximum frequencies for fitting, e.g. from 1/600 to 1 Hz may be defined.

The fitting function and spectrum to be fitted may be normalized by using the variance of the range of the spectrum in the fitting range, i.e. the variance of the spectrum between the minimum and maximum frequencies.

A fitting cost function may be defined in order to give proper weights to the frequencies of interest. The integral length scale, Lint may be obtained by minimizing the cost function. Accordingly, the integral length scale, Lint may be determined for each bin.

A check of the data quality may be performed. The check may be based on bin count and fitting accuracy. For example, bins containing less than 10 spectra may be marked as having reduced quality or may be ignored. In another example, a minimum fitting accuracy may also be used to remove poor quality data, e.g. poor quality Kaimal power spectra fits.

Embodiments relating to length scale and time scale are described in the following.

The integral timescale or length scale may be understood to represent a temporal or spatial period, respectively, which represent the typical size or persistence of the most energetic eddies.

In the atmosphere, eddy size generally scales with the height at which it is measured. Additionally, eddy size also depends on atmospheric conditions. At a 100 m height, the typical eddy size may be about 100 m. Eddy size can go down to 10 m at night, during which atmospheric conditions are relatively stable. During the day, eddy size may be up to several km in length, during which atmospheric conditions are unstable.

In embodiments, length scale may be characterised as follows. It is noted here that the terms 'integral time scale' and 'time scale' are used interchangeably. The terms 'integral length scale' and 'length scale' are also used interchangeably.

Wind speed data may be obtained in the form of a time series of wind speed, u(t). A time series of wind speed can be understood as wind speed measurements made at a fixed spatial point. An auto-correlation function, ρ(s) as given by the formula:

$$\rho(s) = \frac{\langle u(t)u(t+s)\rangle}{\langle u(t)^2\rangle},$$

describes a signal's persistence of a statistically stationary process, where s is lag.

Time scale, $T_{int}$ may be determined as an integral of the auto-correlation function, $\rho(s)$, according to the equation:

$$T_{int} = \int_0^\infty \rho(s)ds.$$

Accordingly, the auto-correlation function is a tool that can be used to characterise a time scale, $T_{int}$ of a time series of wind speed. Time scale, $T_{int}$ is a measure of the temporal correlation distance of a statistically stationary process.

Thus, length scale, $L_{int}$ can be determined from time scale when wind speed is known. That is, length scale may be determined as a product of horizontal wind speed, HWS and time scale, $T_{int}$, according to the formula: $L_{int} = HWS \times T_{int}$.

In embodiments, timescale, $T_{int}$ may also be determined from power spectra. A power spectrum, S(f) describes where the time scale of the turbulent energy. In other words, a power spectrum describes if the turbulent energy is slow, fast etc. Thus, it may be understood that wind spectra are a function of atmospheric conditions. The energy spectrum and autocorrelation are directly related.

Since the auto-correlation function, $\rho(s)$ is based on the power spectrum, time scale, $T_{int}$ is given by the integral of the auto-correlation function, $\rho(s)$, according to the formula:

$$T_{int} = \int_0^\infty \rho(s)ds = \frac{\lim_{f\to 0} S(f)}{2\langle U(t)^2\rangle},$$

where $$S(f) = \langle \hat{u}(f)\hat{u}(f)^*\rangle,$$

$$\hat{u}(f) = \int_{-\infty}^{+\infty} u(t)e^{-i2\pi ft}dt.$$

In embodiments, length scale, $L_{int}$ may also be directly estimated using an estimator, for example, by defining a model equation that models or equivalently models the dynamics, in particular, the meaningful or dominant dynamics, of the wind flow.

The model equation may take the form of a low-pass filter: $\dot{v}_t = -\omega_c v_t + \omega_c n_t$ where the cut-off frequency may be determined from the turbulence dynamics of the wind flow.

A length scale estimator may take a form of a first order low-pass filter, according to the formula:

$$\dot{v}_t = -\frac{\pi v_m}{2L}v_t + \frac{\pi v_m}{2L}n_t,$$

where $v_t$ is the turbulence process, $v_m$ is the mean wind speed (for example, 10 minute average wind speed over a moving window), L is an integral lengthscale which can be linked to a cut-off frequency $$\omega_c = \frac{\pi v_m}{2L},$$

and $n_t$ is the zero mean white Gaussian noise turbulence process noise. The $\dot{v}_t$ notation refers to the temporal derivative of the turbulence process, $v_t$.

Turbulence process noise $n_t$ may be approximately as a Gaussian distribution according to the following: $n_t \sim \mathcal{N}(0, \sigma_t^2)$, where $\sigma_t = t_i v_m$. Turbulence intensity, $t_i$ and mean wind speed, $v_m$ may be used in the approximation of the turbulence process noise, $n_t$.

Cut-off frequency, $\omega_c$ can be calculated according to the formula: $\omega_c = 2\pi f^*$, where $f^*$ is the frequency that maximizes fS(f).

Turbulence can be modelling using a Kaimal power spectrum. The Kaimal power spectrum may be approximated as a first order transfer function. For example, power spectrum, S(f), may be given according to the formula:

$$S(f) = \frac{4Lt_i^2 v_m}{\left(1 + 6f\frac{L}{v_m}\right)^{5/3}}.$$

Length scale, L in meters, turbulence intensity, $t_i$, and mean wind speed, $v_m$ may be as described previously or elsewhere in this specification.

The frequency, $f^*$ that maximizes fS(f) can be calculated, leading to the formula:

$$f^* = \frac{v_m}{4L}.$$

This relationship enables the determination of length scale according to the characteristic frequency of the spectrum.

Thus, using the Kaimal power spectrum, cut-off frequency, $\omega_c$ can be given according to the formula:

$$\omega_c = \frac{\pi v_m}{2L}.$$

Mean wind speed, $v_m$ and length scale, L may be as described previously or elsewhere in this specification.

Thus, using the cut-off frequency, $\omega_c$ derived from the Kaimal spectrum model, the state model for the estimator can be given as:

$$\dot{v}_t = -\frac{\pi v_m}{2L}v_t + \frac{\pi v_m}{2L}n_t.$$

The first derivative of length scale, $\dot{L}$ may be modelled as zero mean white Gaussian noise process noise, $n_L$ or also called as a random walk process.

In the state model, $v_t$ is the turbulence process, L is the length scale, $n_t$ is the zero mean white Gaussian noise turbulence process noise, as described earlier. Cut-off frequency, $f_c$ may be given by the equation:

$$f_c = \frac{v_m}{4L}$$

where, $f_c$ is the frequency that maximizes $f*S(f)$. $f$ is the frequency and $S(f)$ is the Kaimal spectrum.

Temporally, the wind process may be modelled in two components: a slow moving process, for example, mean wind speed, $v_m$, and a fast moving process, for example, turbulent wind $v_t$. The measured or estimated wind speed can be written as sum of mean wind speed, $v_m$ and turbulent wind speed, $v_{t,m}$, hence turbulent wind speed, $v_{t,m}$ can be computed by taking the difference of the measured or estimated wind speed and the mean wind speed, $v_m$. The measurement model for estimator, can be given by the formula: $v_{t,m}=v_t+w_t$, where $w_t$ is normally distributed as follows: $w_t \sim \mathcal{N}(0, R_t)$ and $v_{t,m}$ is measured or estimated wind speed.

With the defined state model and measurement model, an estimator is designed to estimate the integral length scale using the real-time measured or estimated wind speed data from a simulation or a wind farm. The estimator can be a least-squares estimator or extended Kalman filter or unscented Kalman filter or a Monte-Carlo filter that can run on an embedded device.

Embodiments relating to the correction model are described in the following.

Examples of the correction model include simple correction scaling model, a linear regression model, a non-linear regression model, or a non-parametric regression model.

In an exemplary embodiment, the correction model is a spectral correction model, e.g. a transfer function between power spectrum density from rotor effective wind speed data, $PSD_{REWS}$ and power spectrum density from reference sonic anemometer wind speed data, $PSD_{Sonic}$.

For example, the correction model may take a form of a correction factor $A(f)$ according to $PSD_{REWS}=A(f)*PSD_{Sonic}$. In such a case, the corrected turbulence intensity, $Var_{REWS}=\int PSD_{REWS} df = \int A(f)*PSD_{Sonic}\ df = C \times Var_{Sonic}+B$. Example forms of the correction factor $A(f)$ may be any one of the following:

$$A[\alpha, \beta](f) = 1/(1 + \alpha fL/V)^\beta,$$

$$A[\alpha, \beta](f) = 1/(1 + \alpha fD/V)^\beta,$$

$$A[\alpha, \beta](f) = 1/(1 + \alpha f)^\beta, \text{ or}$$

$$A(f) = PSD_{REWS}/PSD_{Sonic}$$

where $\alpha$, $\beta$ denote fitting constants, L denotes length scale, V denotes average wind speed e.g. 10 minute average wind speed, and D is a physical constant.

The wind speed characteristics, such as turbulence intensity, TI and length scale, L may be estimated in a recursive or online fashion. For example, updated turbulence intensity parameter, TI, and length scale parameter, L are recalculated at regular time intervals, e.g. 10 minute intervals.

Updated parameters may be based on the most recent wind speed data. In an exemplary embodiment, updated turbulence intensity parameter, and updated length scale parameter, L are used to update the correction model, e.g. $A[\alpha,\beta](f)=1/(1+\alpha fL/V)^\beta$.

Alternatively, either one, other factors, or any combination of factors thereof may be updated. Other factors may include for example vertical wind shear. Recursive or online estimation improves the dynamic performance of the correction model and efficient operation of wind turbine is achieved.

In some embodiments, the correction model may take the form of a ratio. For example, based on a turbulence intensity parameter from rotor effective wind speed and from reference wind speed data, a ratio of the two turbulence intensity parameters may be empirically derived.

The ratio is exemplarily a function of at least one of the following parameters: average wind speed, turbulence intensity, and length scale. The turbulence intensity parameter is exemplarily the variance of wind speed over a time period, e.g. 10 minute time period, to the mean wind speed over the same time period.

Accordingly, a fast correction can be obtained and efficient operation of a wind turbine is achieved.

Some advantages relating to the various aspects and/or embodiments described as follows. A turbulence intensity estimator to estimate the turbulence intensity may be based on a ratio of the standard deviation to the mean of the rotor effective wind speed.

Such a turbulence estimator results in underprediction of turbulence intensity because the rotor effective wind speed is an average of the wind field over a large spatial extent. Accordingly, such a turbulence intensity wind characteristic does not accurately depict the load conditions that a blade experiences.

Thus, a turbulence intensity estimate based on the ratio of the standard deviation to the mean of the rotor effective wind speed results in a poor load prediction.

To more accurately estimate the turbulence intensity of the wind incident on a turbine, the actual wind conditions needs to be first obtained before the wind hits the blades. Actual wind conditions near a turbine may be provided by a transformation or processing of the rotor effective wind speed signal.

This transformation or model may be obtained through offline or online learning of the mast wind speed and rotor effective wind speed estimate. The transformation or the model may use an accurate length scale measure which can be obtained through an online recursive estimation technique.

This transformation of the rotor effective wind speed signal provides corrected wind speed characteristics using the estimated length scale. Corrected wind speed characteristics may be used for online load and performance management.

Alternatives include using different correction factors and methods for correction. Additional sensors may also be used in a predictor and corrector approach to improve turbulence intensity estimation accuracy.

The method of using a correction model is unique because the correction model can be applied in an online fashion such that the estimated length scale and turbulence intensity may be used for load and performance management. The inventors have demonstrated the concept with simulations using both high fidelity modelling data and data from the field.

Good online estimation of turbulence intensity and length scale is important for good load management and performance estimation. Performance estimation directly impacts annual energy production.

Typically, a 1% error in turbulence intensity estimation translates to 1% error in load estimation and 0.2% error in levelized cost of energy estimation. Current turbulence estimations typically have errors of about 30%.

Thus, improving the accuracy of turbulence intensity estimation from rotor-effective wind speed estimates in the model-based controller is important for good load management and performance estimation.

Improving length scale estimation is critical. A 25% uncertainty in the length scale estimate can contribute up to 2.5% change in damage equivalent load estimation and 0.5% change in annual energy production estimation.

Thus, an improved estimate of real-time turbulence intensity for an individual wind turbine improves load estimation for lower levelized cost of energy. Power production control is also improved for higher annual energy production.

Corrected wind speed characteristics enables more than 0.25% improvement in annual energy production and 1% improvement in damage equivalent loads.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

In an example, a method of operating a wind turbine includes determining a correction model associated with the wind turbine, determining a corrected turbulence intensity parameter associated with the wind turbine based on the correction model, and/or operating the wind turbine based on the corrected turbulence intensity parameter.

In an example, a method of siting a wind turbine at a new site includes determining a site correction model, determining an adjusted turbulence intensity parameter associated with the new wind turbine at the new site, and/or siting the wind turbine at the new site based on the adjusted turbulence intensity parameter.

In an example, a method of siting a new wind turbine includes determining a site correction model, determining an adjusted turbulence intensity parameter that is associated with the new wind turbine based on the site correction model, and/or siting the new wind turbine based on the adjusted turbulence intensity parameter.

In an example, an apparatus includes a wind turbine including at least two rotor blades, and/or a model-based controller configured for determining rotor averaged wind speed. The wind turbine may be operated according to embodiments described herein or sited according to embodiments described herein.

In an example, a wind farm includes at least one wind turbine, and/or a wind farm controller. The wind farm controller may include a processor configured to perform a method according embodiments described herein.

In an example, a system for operating a wind turbine includes a processor configured to perform a method according to embodiments described herein.

In an example, a method to operate a wind turbine includes determining a correction model associated with the wind turbine; determining a corrected turbulence intensity parameter associated with the wind turbine based on the correction model; and/or operating the wind turbine based on the corrected turbulence intensity parameter.

In an example, a method of determining the correction model includes receiving a first and a second plurality of wind data; processing the first and/or the second plurality of wind data to determine a first and/or a second set of estimates respectively. Each set of estimates may include at least one from a group including a normalised plurality of wind data, a power spectral density of the plurality of wind data, a turbulence intensity parameter, a turbulence length scale parameter; and/or calibrating the correction model based at least on one from the first set of estimates and at least one from the second set of estimates.

In an example, the first plurality of wind data are wind speeds associated with the wind turbine and/or include wind speeds from at least one from a group including rotor averaged wind speeds, blade estimated wind speeds, nacelle anemometer wind speeds, SODAR based wind speeds and LIDAR based wind speeds.

In an example, the second plurality of wind data include wind speeds obtained from at least one from a group including a meteorological mast, a set of aeroelastic simulations, and/or a set of measurements associated with a test wind turbine.

In an example, determining the corrected turbulence intensity includes receiving a third plurality of wind data; and/or processing the third plurality of wind data to determine a third set of estimates. The third set of estimates may include an uncorrected turbulence intensity parameter, and/or optionally at least one from a group including a normalised plurality of wind data, a power spectrum, and a turbulence length scale parameter.

In an example, the third plurality of wind data are wind speeds associated with the wind turbine and/or include at least one from a group including rotor averaged wind speeds, nacelle anemometer wind speeds, SODAR based wind speeds and LIDAR based wind speeds.

In an example, operating the wind turbine based on the corrected turbulence intensity includes determining an operational parameter of the wind turbine based on the corrected turbulence parameter.

In an example, the correction model includes at least one from a group including a scaling model, a linear regression model, a non-linear regression model, and a non-parametric regression model.

In an example, determining the corrected turbulence intensity parameter is performed recursively at a regular time interval. The time interval may be between 5 minutes and 30 minutes.

In an example, calibrating a site correction model based on at least a second plurality of wind data and/or a corrected turbulence intensity parameter.

In an example, determining an adjusted turbulence intensity parameter based on a fourth plurality of wind data and a site correction model.

In an example, siting a new wind turbine based on an adjusted turbulence intensity parameter.

In an example, a fourth plurality of wind data includes wind speeds obtained from a meteorological mast that is at a site different from site(s) associated with a second plurality of wind data.

In an example, a wind turbine includes at least two rotor blades and/or a model-based controller configured for determining rotor averaged wind speed. The wind turbine may be operated according to embodiments described herein or sited according to embodiments described herein.

In an example, a wind farm includes at least one wind turbine and/or a wind farm controller. The wind farm controller may include a processor configured to perform the method according to embodiments described herein.

In an example, a system for operating a wind turbine includes a processor configured to perform a method according to embodiments described herein.

What is claimed is:

1. A method to operate a wind turbine having a rotor with a plurality of blades connected thereto, the rotor connected to a generator, the method comprising:
   determining a correction model associated with the wind turbine;
   determining a corrected turbulence intensity parameter associated with the wind turbine based on the correction model and a first plurality of wind data corresponding to a received rotor effective wind speed data;
   operating the wind turbine based on the corrected turbulence intensity parameter; and
   wherein the received rotor effective wind speed is a spatial average of a wind field over an entire plane of the rotor and is determined by a model-based controller based on power output of the generator, rotor speed, and pitch of the blades.

2. The method according to claim 1, wherein determining the correction model comprises:
   receiving a second plurality of wind data;
   processing the first and the second plurality of wind data to determine a first and a second set of estimates respectively, each set of estimates including at least one of: a normalized plurality of wind data, a power spectral density of the plurality of wind data, a turbulence intensity parameter, or a turbulence length scale parameter; and
   calibrating the correction model based at least on one from the first set of estimates and at least one from the second set of estimates.

3. The method according to claim 2, wherein the second plurality of wind data comprise wind speeds obtained from at least one of: a meteorological mast, a set of aeroelastic simulations, or a set of measurements associated with a test wind turbine.

4. The method according to claim 2, wherein determining the corrected turbulence intensity comprises:
   receiving a third plurality of wind data; and
   processing the third plurality of wind data to determine a third set of estimates, the third set of estimates including an uncorrected turbulence intensity parameter, and at least one of: a normalised plurality of wind data, a power spectrum, and a turbulence length scale parameter.

5. The method according to claim 4, wherein the third plurality of wind data are wind speeds associated with the wind turbine and comprise at least one of: rotor averaged wind speeds, nacelle anemometer wind speeds, SODAR based wind speeds, and LIDAR based wind speeds.

6. The method according to claim 1, wherein operating the wind turbine based on the corrected turbulence intensity comprises determining an operational parameter of the wind turbine based on the corrected turbulence parameter.

7. The method according to claim 1, wherein the correction model comprises at least one of: a scaling model, a linear regression model, a non-linear regression model, or a non-parametric regression model; or wherein determining the corrected turbulence intensity parameter is performed recursively at a regular time interval of between 5 minutes and 30 minutes.

8. The method according to claim 4, further comprising calibrating a site correction model based on at least the second plurality of wind data and the corrected turbulence intensity parameter.

9. A wind turbine including at least two rotor blades and a model-based controller configured for determining rotor averaged wind speed, wherein the controller is configured to operate the wind turbine according to claim 1.

10. A wind farm comprising at least one wind turbine and a wind farm controller, the wind farm controller comprising a processor configured to perform the method according to claim 1.

11. A system for operating a wind turbine, the system comprising a processor configured to perform the method according to claim 1.

12. A method to operate a wind turbine, the method comprising:
    determining a correction model associated with the wind turbine;
    determining a corrected turbulence intensity parameter associated with the wind turbine based on the correction model;
    operating the wind turbine based on the corrected turbulence intensity parameter;
    wherein determining the correction model comprises:
      receiving a first and a second plurality of wind data;
      processing the first and the second plurality of wind data to determine a first and a second set of estimates respectively, each set of estimates including at least one of: a normalized plurality of wind data, a power spectral density of the plurality of wind data, a turbulence intensity parameter, or a turbulence length scale parameter; and
      calibrating the correction model based at least on one from the first set of estimates and at least one from the second set of estimates;
    wherein determining the corrected turbulence intensity comprises:
      receiving a third plurality of wind data; and
      processing the third plurality of wind data to determine a third set of estimates, the third set of estimates including an uncorrected turbulence intensity parameter, and at least one of: a normalised plurality of wind data, a power spectrum, and a turbulence length scale parameter;
    calibrating a site correction model based on at least the second plurality of wind data and the corrected turbulence intensity parameter; and
    determining an adjusted turbulence intensity parameter based on a fourth plurality of wind data and the site correction model.

13. The method according to claim 12, further comprising siting a new wind turbine based on the adjusted turbulence intensity parameter.

14. The method according to claim 12, wherein the fourth plurality of wind data comprises wind speeds obtained from a meteorological mast that is at a site different from a site associated with a second plurality of wind data.

* * * * *